Figure 1:
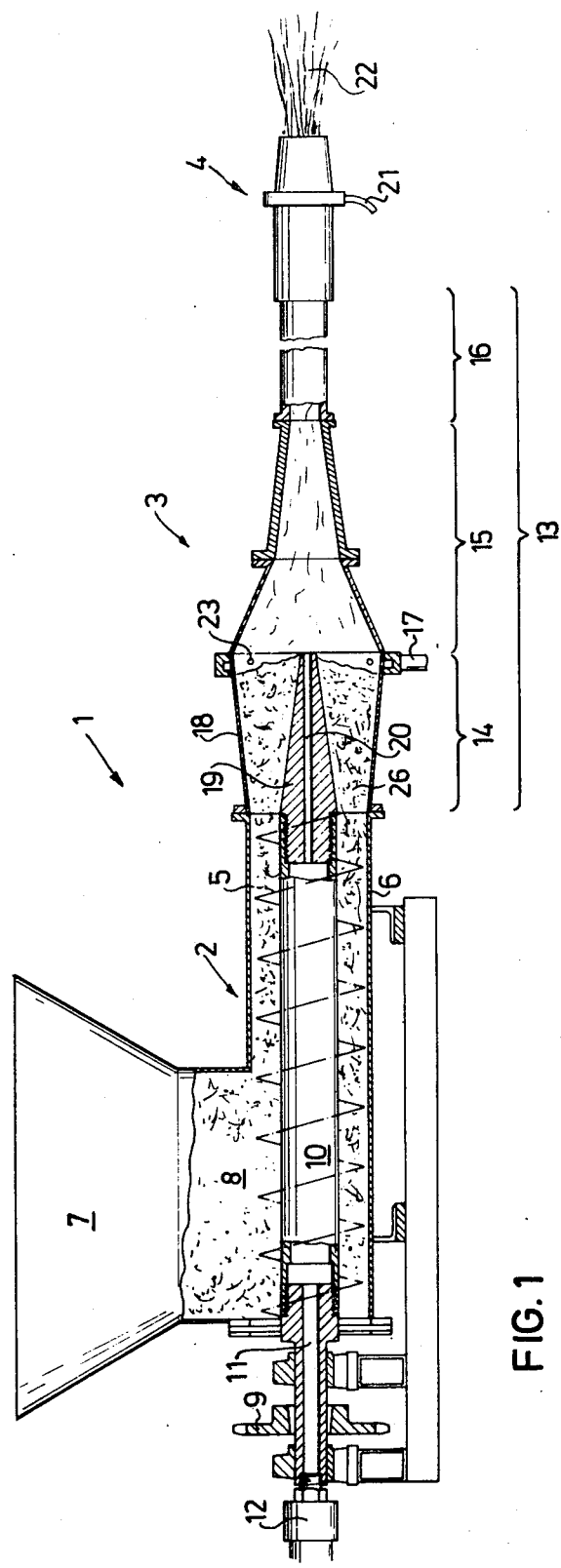

United States Patent [19]
Norén

[11] 4,138,162
[45] Feb. 6, 1979

[54] APPARATUS FOR PIPED CONVEYANCE OF MATERIAL

[76] Inventor: John P. Norén, Kedjevágen 30, S-194 00 Upplands Vásby, Sweden

[21] Appl. No.: 812,689

[22] Filed: Jul. 5, 1977

[30] Foreign Application Priority Data

Jul. 6, 1976 [SE] Sweden .................................. 7607669

[51] Int. Cl.² ............................................ B65G 53/48
[52] U.S. Cl. ..................................................... 302/50
[58] Field of Search ...................... 302/25, 40, 45, 46, 302/50, 51, 57

[56] References Cited
U.S. PATENT DOCUMENTS 2,127,693  8/1938  McCanless et al. .................... 302/50

FOREIGN PATENT DOCUMENTS 1169370  4/1964  Fed. Rep. of Germany ............. 302/50

Primary Examiner—Robert W. Saifer
Assistant Examiner—James L. Rowland
Attorney, Agent, or Firm—O'Brien and Marks

[57] ABSTRACT

An apparatus for piped conveyance of material. The material to be conveyed is introduced into a conveyor pipe where it is caused to pass through a blocking section located upstream of a location where compressed air is introduced into the conveyor pipe. In the blocking section, which has an increasing through-flow area in the conveying direction, a material plug is formed by the action of compressed air introduced at the downstream end thereof. The plug seals in a direction upstream and is at its downstream end continuously broken up and blown downstream by means of compressed air.

6 Claims, 3 Drawing Figures

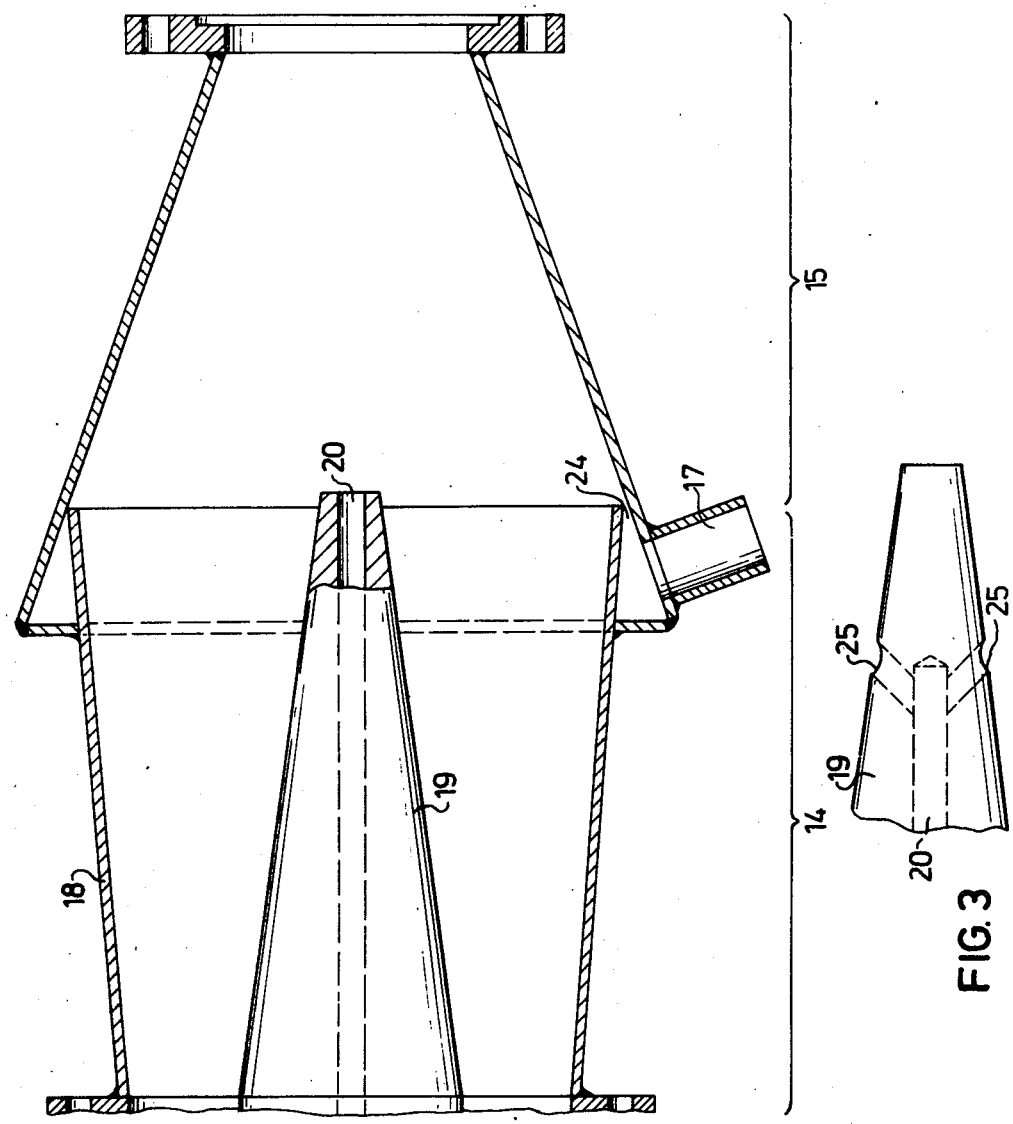

APPARATUS FOR PIPED CONVEYANCE OF MATERIAL

The present invention relates to a apparatus for conveying material by pipe, especially material mixtures such as fibre concrete mixture, lightweight concrete mixture and/or concrete mixture with artificial resin, mixed in where material is fed into a conveying pipe provided with at least one supply inlet for compressed air supply location and is conveyed further by means of the supplied compressed air.

In spraying concrete it is usual to utilize compressed air to convey a mixture comprising cement and sand from a container through a hose to a nozzle where water is added. Machines which dispatch a batch of material at a time through the hose are generally utilized for such conveyance. An example of such a machine is described in the Swedish patent application 4068/72. Under a hopper for cement mixture there is a rotatable conveyor drum, provided with a plurality of separate compartments which can be filled with cement mixture. Each of the compartments can be advanced to an emptying device, which includes a sealing lid equipped with a compressed-air inlet and a conveyor pipe. By introducing compressed air, all the cement mixture can be forced out via the conveyor pipe. The next compartment is then advanced to the emptying device. For satisfactory operation it is necessary that the seal between compartment and emptying device is good, something which causes problems since wear is usually very large in such apparatuses. The situation becomes especially troublesome when it is desired to use fibre reinforcing, e.g. in the form of steel fibres blended into the cement mixture.

Ejectors have also been used in the prior art for conveying material by pipe, e.g. powdery material. The drawback is, however, that the pressure will be too low to enable concrete spraying, for example, and that large amounts of air are required.

The invention aims at providing an apparatus for piped conveyance of material eliminating the disadvantages mentioned, and enabling conveying at relatively high pressure without the assistance of mechanical seals.

This is achieved according to the invention in that the material is caused to pass through a blocking section situated in the conveyor pipe upstream of the location for supplying compressed air, the blocking section having an increasing through-flow cross-sectional area in the conveying direction, the material in the blocking section being caused to form, with the help of compressed air supplied to the conveyor pipe generally downstream of the blocking section, a plug that substantially seals in an upstream direction, the downstream end of the plug being continuously broken up and blown downstream by means of the compressed air supplied to the downstream end of the blocking section. To this end compressed air can be supplied centrally to the conveying pipe and/or at the periphery of the conveying pipe.

The material plug formed in the blocking section simply and effectively prevents upstream leakage of compressed air, thereby eliminating the need of mechanical seals. Furthermore, the advantage is gained in that those parts of the conveying apparatus situated upstream of the blocking section will not be subjected to violent compressed-air shocks, e.g. when the conveying pipe becomes clogged up.

The invention is provided with a conveyor pipe connected to a feed means, said conveyor pipe having at least one compressed-air supply location. Said invention is characterized in that between the feed means and the compressed-air supply location, the conveyor pipe has a blocking section, said blocking section having an increasing through-flow cross-sectional area in the conveying direction, the relationship between the greatest and the smallest through-flow cross-sectional area in the blocking section, as well as its length, being so adjusted to the kind of material conveyed that a material plug, which substantially seals backwards in relation to the conveying direction, is formed in the blocking section when compressed air is supplied to the conveyor pipe. By adjusting the shape of the blocking section to the kind of material conveyed, good sealing can be obtained continuously, and the need for periodically exchanging sealing means is eliminated.

Further advantageous embodiments and advantages of the invention are apparent from the following description and the patent claims.

The invention will now be explained more closely in the following with the help of embodiment examples shown on the appended drawing, where FIG. 1 shows schematically an apparatus suitable for concrete spraying, and which is made according to the invention, FIG. 2 shows a variation of a portion of the apparatus shown in FIG. 1, and FIG. 3 shows a variation of a detail to the apparatus shown in FIGS. 1 and 2.

A possible application of the invention is shown in FIG. 1 where a spraying unit 1 intended for concrete spraying includes a feed means 2, a conveying means 3 according to the invention and a spray nozzle 4. In the case shown, the feed means 2 includes a conveyor screw 5 rotatably mounted in a housing 6, which in turn is in communication with a feed hopper 7 for a material 8 to be conveyed. The material 8 can, for example, be a substantially dry mixture of cement and sand, possibly with an addition of reinforcing fibres and other components necessary or customary in concrete spraying. The material 8 can thus be a mixture of a plurality of different particles with varying shape, size and weight. For concrete spraying purposes, such mixtures as lightweight concrete mixture and/or concrete with artificial resin mixed in can come into consideration.

The conveyor screw 5 is provided with a driving means 9, driven by a driving apparatus not shown here, but which can suitably be of conventional type. The conveyor screw shaft 10 is provided with a through duct 11 extending therethrough communicating with a compressed-air connection 12. The feed means 2 and the spray nozzle 4 are united by a conveyor pipe 13 suitably made in several sections. In the case shown here, the conveyor pipe 13 includes a blocking section 14, a transition section 15 and a transport section 16. The conveyor pipe 13 is furthermore provided with a compressed-air supply location 17.

As is apparent from the figure, the blocking section 14 has an increasing through-flow cross-sectional area in the conveying direction, and its downstream end is situated substantially in the same region as the compressed-air supply location 17. In the case shown here, the blocking section 14 includes a casing pipe 18 with an interiorly placed central body 19, the casing pipe 18 generally having the shape of a truncated cone and being connected to the conveyor screw housing 6. The central body 19 is conical, with its longitudinal axis substantially coincidental with that of the casing pipe. The narrow end of the casing pipe 18 and the base end of the central body 19 face upstream. The central body 19 forms an extension to the shaft 10 of the conveyor screw 5 and is provided with a duct 20, one end of which opens out at the tip of the central body, while its other end is in communication with the duct 11.

The transport section 16, which can for example be a flexible hose, usually has a relatively small diameter, often of the order of magnitude of about 5 cm, whereas the conveyor screw 5 has a larger diameter. It is therefore usually necessary to have a transition section 15 with a decreasing cross-sectional area in the conveying direction, between the blocking section 14 and the transport section 16. The spray nozzle 4 is suitably, in a conventional manner, provided with a water supply inlet 21, whereby a wet mixture 22 can be sprayed out from the spray nozzle 4.

The compressed-air supply location 17 suitably opens out in the casing pipe 18 of the blocking section 14 via a plurality of openings 23 distributed peripherally thereabout.

It is naturally possible to supply compressed air to the conveyor pipe in a number of different ways, and therefore the apparatus shown in FIG. 1 can be modified according to desire. In a variation shown in FIG. 2 the connection between the blocking section 14 and the transition section 15 has been formed so that the compressed-air supply location 17 opens out into an annular gap 24 outside the casing pipe 18. As is apparent from FIG. 3, the duct 20 in the central body 19, instead of opening out at the tip of the central body, can open out into one or more orifices 25 in the circumferential surface of the central body, suitably near the tip. The orifices 25 can suitably be directed slopingly downstream, as is apparent from the figure.

The apparatus described here functions in the following manner:

Material 8 is continuously fed through the screw housing 6 and into the blocking section 14 with the aid of the conveyor screw 5. As a result of compressed air being supplied to the downstream end of the blocking section 14, the material 8 in the blocking section will be subjected to a force directed upstream, so that a substantially sealing plug 26 is obtained, to prevent compressed air from leaking into the screw housing 6. As feeding with the aid of the conveyor screw 5 continues, the plug 26 will be moved downstream. When its forward portion is in the region of the downstream end of the blocking section 14, this portion of the plug will be continuously broken up and blown downstream with the help of compressed air supplied to the duct 20 in the central body 19 and to the compressed-air supply location 17. It is obvious that conveying ability will be affected by how, where, at what pressure and in what amount compressed air is supplied. In certain cases the type of embodiment shown in FIG. 1 is to be preferred, whereas in other cases the embodiments shown in FIGS. 2 and 3 may be preferred. It is of course also possible to supply compressed air only centrally via the central body 19 or only peripherally via the compressed-air supply location 17.

The relationship between the greatest and the smallest through-flow cross-sectional area in the blocking section 14, as well as the length of the blocking section, should suitably be adjusted to the kind of material conveyed, to ensure that a material plug 26 can be obtained which gives sufficiently good sealing. The compressed-air supply should also be suited to the kind of material conveyed, and it can therefore be found desirable to supply differently large amounts of air in different places, possibly at different pressures. As already mentioned, different conveying results can be obtained by directing the supply orifices for the compressed air in different ways. For example, it can be advantageous to direct the orifices 23 in such a way that the material is given a helical movement in the transition section 15.

In the embodiment shown here, there is a central body 19 in the blocking section 14. However, by using another kind of feed means 2 it may be possible to eliminate the need of a central body. The transition section 15 naturally does not need to be conical either, as is shown in this case, but can have any other suitable form whatsoever. In certain cases it can also be suitable to use several compressed-air supply locations 17 placed one after the other.

What I claim is:

1. An apparatus for the piped conveyance of material, such as concrete mixtures, comprising
   feed means for supplying the material,
   a conveyor pipe connected to the feed means to transport the material;
   a blocking section located at the upstream end of the conveyor pipe so as to receive material from the feed means; and
   at least one compressed air supply means for introducing compressed air into the conveyor pipe, the compressed air supply means being located at the downstream end of the blocking section;
   the blocking section being formed in the shape of a truncated cone with its smaller end connected to the feed means and its larger end oriented downstream to thus form an increasing cross-sectional area for flow of the material so that the compressed air will cause the material both to form a plug in the blocking section to prevent passage of the compressed air to the feed means and to be continuously broken up and blown down the conveyor pipe once it reaches the downstream end of the blocking section.

2. An apparatus as claimed in claim 1 wherein a conically shaped central body is positioned inside the blocking section with its small end oriented downstream.

3. An apparatus as claimed in claim 2 wherein the central body has a duct formed through it opening through the downstream end thereof and wherein the duct is a part of the compressed air supply means.

4. An apparatus as claimed in claim 3 wherein the feed means includes a housing and a conveyor screw rotatably mounted in the housing, the blocking section being mounted on the end of the housing and the central body being mounted on the end of the conveyor screw, the conveyor screw also being adapted to supply compressed air to the duct in the central body.

5. An apparatus as claimed in claim 1 wherein the compressed air supply includes a plurality of openings formed around the periphery of the blocking section at the downstream end thereof.

6. An apparatus as claimed in claim 1 wherein the conveyor pipe further includes a transition section tapering downward in cross-sectional size downstream from the blocking section and a transport section connected to the transition section to carry the material to its location of use.

* * * * *